US007590457B2

(12) United States Patent
Beij et al.

(10) Patent No.: US 7,590,457 B2
(45) Date of Patent: Sep. 15, 2009

(54) METHOD FOR BONDING A LIGHTING DEVICE TO A LIGHTING SYSTEM WHILE USING WIRELESS COMMUNICATION

(75) Inventors: Marcel Beij, Eindhoven (NL); Arnold Buij, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 170 days.

(21) Appl. No.: 11/576,919

(22) PCT Filed: Oct. 6, 2005

(86) PCT No.: PCT/IB2005/053284

§ 371 (c)(1),
(2), (4) Date: Apr. 9, 2007

(87) PCT Pub. No.: WO2006/040712

PCT Pub. Date: Apr. 20, 2006

(65) Prior Publication Data

US 2007/0250181 A1 Oct. 25, 2007

(30) Foreign Application Priority Data

Oct. 15, 2004 (EP) .................................. 04105065

(51) Int. Cl.
*G05B 19/18* (2006.01)
*G06F 15/16* (2006.01)
*H05B 37/04* (2006.01)

(52) U.S. Cl. ........................... 700/3; 315/149; 709/211

(58) Field of Classification Search ..................... 700/3; 315/149; 709/211
See application file for complete search history.

(56) References Cited

U.S. PATENT DOCUMENTS 5,962,992 A 10/1999 Huang et al.
7,009,348 B2 * 3/2006 Mogilner et al. ............ 315/307
7,417,556 B2 * 8/2008 Ling ..................... 340/825.69
2002/0154025 A1 10/2002 Ling
2003/0200434 A1 10/2003 Arnoux

FOREIGN PATENT DOCUMENTS

EP 0507381 10/1992
EP 558349 9/1993
WO 0213490 2/2002

* cited by examiner

*Primary Examiner*—Albert DeCady
*Assistant Examiner*—Thomas H Stevens

(57) ABSTRACT

A method for bonding a lighting device to a first lighting system, in which the first system comprises a master controller, which is remote from the lighting device and which may control a slave controller of the lighting device if the slave controller has stored therein an identification (ID) of the system. Upon powering up, if the slave controller contains such an ID, it tries to communicate with a master controller of the system. If the slave controller does not succeed in establishing such a communication it enters a state in which it can change it settings, in particular clearing said ID, upon receiving, during a time window with reduced communication security level, a message for allowing such changing of its settings.

3 Claims, 1 Drawing Sheet

METHOD FOR BONDING A LIGHTING DEVICE TO A LIGHTING SYSTEM WHILE USING WIRELESS COMMUNICATION

FIELD OF THE INVENTION

The invention relates to a method for bonding a lighting device to a lighting system while using wireless communication as described in the preamble of claim 1.

BACKGROUND OF THE INVENTION

A slave controller having stored therein an identification of a system will respond to instructions for controlling a light emitter of the device only if the slave controller can positively confirm that said instructions are received from the master controller of the system.

With the prior art a problem arises when a slave controller of a lighting device contains a system identification and one wants to bond the lighting device to a different system, with the lighting device being moved geographically or not. For security reasons access to the slave controller will be limited such, that resetting of a stored system identification to a default value is prohibited. Instead one could conceive a method in which identification numbers or labels are applied invisibly from the outside to a lighting device, which, with some effort, could be read by a user and then entered into the master controller of a different system to bond it to the different system. One could also store such unique numbers of lighting devices on a memory disc, or on a server of an Internet site. These approaches require time consuming and tedious operations for reading, storing and monitoring of such unique number. Such drawbacks are more serious in case many lighting devices must be allocated from one system to a different system or to different systems and/or the lighting devices are to be spread over several geographically distant locations.

OBJECT OF THE INVENTION

It is an object of the invention to solve the drawbacks of the prior art as described above.

SUMMARY OF THE INVENTION

The above object of the invention is achieved by providing a method as described in claim 1.

With the method according to the invention it is made possible to bond a lighting device to a lighting system, even if the slave controller of the lighting device has stored therein an identification of a different system. There is no need to keep track of lighting devices and unique numbers allocated to them.

BRIEF DESCRIPTION OF THE DRAWINGS

The invention will become more gradually apparent from the following exemplary description in connection with the accompanying drawing. In the drawing.

DETAILED DESCRIPTION OF EXAMPLES

Figure 1:
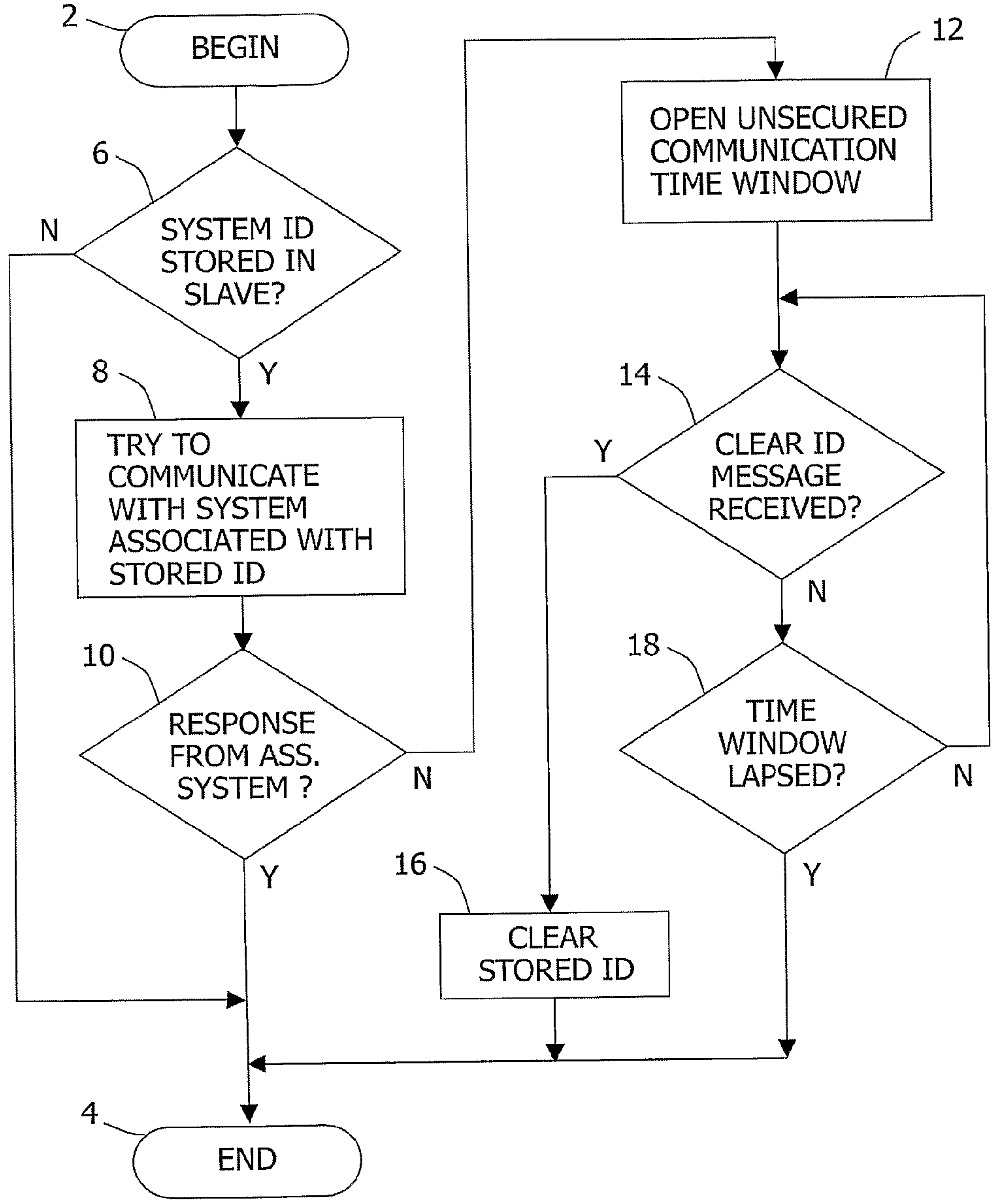
FIG. 1 shows a flow chart of an example of the method according to the invention.

The flow chart shown in FIG. 1 applies to a lighting system (not shown) comprising a master controller and a plurality of lighting devices, with each lighting device comprising a slave controller. A slave controller may store an identification (ID) of the lighting system and the master controller may store identifications of several slave controllers. With such identifications being stored in the master controller and slave controllers, the master controller can then control the lighting devices to selectively turn them on or off or to dim them.

The flow chart shown in FIG. 1 represents a procedure or a method which is entered by a slave controller of a lighting device when the slave controller gets powered. The method is contained between a terminator "BEGIN" 2 down to a terminator "END" 4.

As indicated by decision block 6, the slave controller starts with checking if it has stored a system identification (ID) already. If the slave controller does not contain such an ID the flow terminates at terminator 4. Apparently the slave controller is alike green or new. The slave controller will just wait for a request for communication received from a master controller to bond (associate) the slave controller to the master controller.

If, according to decision block 6, the slave controller decided that it contains a system identification (ID), the slave controller will try to establish a communication with a master controller of the system which is associated with the stored ID, as indicated by block 8.

If the slave controller contains an ID and a master controller associated with the same ID responds the flow terminates at terminator 4.

According to the invention if the slave controller contains an ID but it is unable to find or to communicate with a master controller of a system associated with said ID, as indicated by decision block 10, the slave controller proceeds to block 12.

According to flow block 12, a security level of a security procedure is lowered for allowing access from the outside for changing the stored ID. The security procedure could be bypassed as a whole. In general a communication with such lowered security level could be indicated as an unsecured communication.

Further according to flow block 12, a time window is set or initiated. It is only during said window that a lowered security level for access from the outside is allowed.

During the time window the slave controller monitors the receiving of a clear ID message from the outside, as indicated by decision block 14. Said message indicates that upon its receipt the slave controller is allowed to clear the ID stored by it, as indicated by block 16. After executing the clearing of the ID the flow terminates at terminator 4.

If, as indicated by decision block 18, the clear ID message is not received yet at the end of the time window the flow terminates at terminator 4.

Although not shown in detail in the flow chart of FIG. 1, it is noted that the method as described can be made more sophisticated, in that several time windows are used during which different security levels are used. Preferably the number of windows is limited, e.g. to three.

It is noted that in stead of clearing a system ID stored in a slave controller a flag could be set indicating that the slave controller is ready to receive and store a system ID. The slave controller could operate to remove such flag if it did not receive a system ID to be stored by it. The slave controller could remove such flag also if the received ID is identical to the stored ID.

The invention claimed is:

1. A method for bonding a lighting device to a lighting system, in which a master controller of the system, which is remote from the lighting device, is configured to selectively access a slave controller of the lighting device over a wireless connection for storing an identification (ID) of the system in the slave controller in case no system identification has been stored yet in the slave controller and for controlling the lighting device in case an identification stored in the slave controller is identical to the identification of the system with the accessing master controller, the method comprising:

upon powering up of the lighting device, if its associated slave controller contains a system identification of a system, attempting to establish a communication by the slave controller with a master of the system; and if the attempting by the slave controller fails to establish the communication, setting the slave controller, for a duration of a time window and with reduced communication security, to accept a clear message indicating that the slave controller is allowed to neglect the stored ID.

2. A method according to claim 1, wherein the slave controller applies several of a limited number of time windows with reduced communication security until it receives the clear message.

3. A method according to claim 2, wherein the security level is lowered for a next time interval, if entered.

* * * * *